(12) United States Patent
Lin

(10) Patent No.: US 9,969,471 B2
(45) Date of Patent: May 15, 2018

(54) SUBMARINE STRUCTURE

(71) Applicant: Chen-Hsin Lin, New Taipei (TW)

(72) Inventor: Chen-Hsin Lin, New Taipei (TW)

( * ) Notice: Subject to any disclaimer, the term of this patent is extended or adjusted under 35 U.S.C. 154(b) by 58 days.

(21) Appl. No.: 15/066,176

(22) Filed: Mar. 10, 2016

(65) Prior Publication Data

US 2016/0264224 A1    Sep. 15, 2016

(30) Foreign Application Priority Data

Mar. 11, 2015   (TW) .............................. 104203573 U

(51) Int. Cl.
| | |
|---|---|
| *B63G 8/08* | (2006.01) |
| *B63G 8/36* | (2006.01) |
| *B63G 8/38* | (2006.01) |
| *B63B 35/73* | (2006.01) |
| *B63H 21/17* | (2006.01) |

(52) U.S. Cl.
CPC ............... *B63G 8/08* (2013.01); *B63B 35/73* (2013.01); *B63G 8/36* (2013.01); *B63G 8/38* (2013.01); *B63H 2021/171* (2013.01); *Y02T 70/5245* (2013.01)

(58) Field of Classification Search
CPC ... B63G 8/08; B63G 8/36; B63G 8/38; B63G 8/40; B63G 2008/403; B63G 8/41; B63B 35/73; B63H 2021/171; B63C 11/49; Y02T 70/5245
USPC ........... 114/66, 312, 314, 315, 326–329, 334
See application file for complete search history.

(56) References Cited

U.S. PATENT DOCUMENTS

| | | | | |
|---|---|---|---|---|
| 1,784,549 | A | * | 12/1930 | Shoemaker .............. B63G 8/40 114/322 |
| 1,997,149 | A | * | 4/1935 | Lake ....................... B63C 11/44 114/313 |
| 2,019,059 | A | * | 10/1935 | Sherman ................. B63C 11/44 114/331 |
| 2,273,497 | A | * | 2/1942 | Rivera ..................... B63C 7/26 114/327 |
| 4,276,851 | A | * | 7/1981 | Coleman ................. B63B 1/121 114/313 |
| 8,869,724 | B2 | * | 10/2014 | von der Goltz ........ B63B 35/73 114/66 |

* cited by examiner

*Primary Examiner* — Ajay Vasudeva
(74) *Attorney, Agent, or Firm* — Guice Patents PLLC

(57) ABSTRACT

A submarine structure provides a submarine in which the interior thereof is formed with an accommodation space and an electricity storing chamber connected to the accommodation space and having a battery and a power set having a propeller, and includes: at least one pipe, having the interior installed with at least one cable; at least one floating member, connected to another end of the at least one pipe; at least one energy supplier, disposed and in the floating member or the accommodation space and located at a relatively higher location inside the floating member or the accommodation space; and at least one control board, installed in the accommodation space of the submarine or the floating member, wherein the control board is connected to the energy supplier through the cable of the at least one pipe for providing power and maintaining communication and control.

13 Claims, 10 Drawing Sheets

SUBMARINE STRUCTURE

BACKGROUND OF THE INVENTION

1. Field of the Invention

The present invention relates to a submarine, especially to a submarine structure, in which an energy supplier installed in a floating member can be used for providing electric power to the submarine and electrically charging a battery, and through at least one pipe, the air intaking and discharging performance of an accommodation space of the submarine can be provided and the energy supplier and a power set can be connected for providing power and maintaining communication and control.

2. Description of Related Art

In the general leisure activity on the water or in the water, the most common one is skin diving or scuba diving or taking a small boat or go inside a glass boat having transparent glasses at the bottom of the boat for viewing the scenery under the water (under the ocean); however, the skin diving is only suitable in a shallow water area, because the tourist only wears a simple goggles with a breathing tube, so he/she can only dive in a shallow water area with his/her head facing down and only small amount of fishes can be seen due to the water is not clear; although scuba diving can allow he/her to see more of the scenery under the water in a deeper water area, the tourist who has no scuba diving outfit or cannot swim or not trained for scuba diving or without much diving experience is strongly advised not to take such a risk because various danger may happened under the water; taking a small boat for viewing the scenery under the water (under the ocean) is unable to allow the tourist to actually dive into the water (into the ocean), so the tourist can only sit in the small boat to see the relatively boring scenery comparing to the vivid one under the water; the glass boat can allow the tourist to see the scenery through the transparent glasses at the bottom of the boat, but the tourist also cannot actually dive into the water, and the viewing sensation may be affected by the lightings and the tourists is unable to look at specified and desired area due to the limitation of the boat, not to mention unable to actually be in the water for skin diving or deep diving, so the experience of viewing different scenery in different water areas (ocean areas) cannot be provided; moreover, the functions that a conventional small boat can provide is very limited, so the boat cannot be voyaged to a specified location by a means of unmanned control or global positioning system, thus the boat is unable to be used for the purposes of military defense or commercial data collection, thus the applicable field is very much limited and the above-mentioned disadvantages shall be seriously concerned by customers and skilled people in the art. Accordingly, the present invention provides a submarine structure in which an energy supplier installed in a floating member can be used for providing electric power to the submarine and electrically charging a battery, and through at least one pipe, the air intaking and discharging performance of an accommodation space of the submarine can be provided and the energy supplier and a power set can be connected for providing power and maintaining communication and control, so the submarine is able to dive into the water for being continuously used for voyaging or floating or skin diving or deep diving, and a function of viewing the scenery under the water can be provided, and the submarine can cruise to a specified location by a means of manual force or unmanned control or global positioning system for the purposes of military defense or commercial data collection, so the operation convenience and mobility can be effectively increased.

SUMMARY OF THE INVENTION

One primary objective of the present invention is to provide a submarine structure, in which an energy supplier installed in a floating member can be used for providing electric power to the submarine and electrically charging a battery, and through at least one pipe, the air intaking and discharging performance of an accommodation space of the submarine can be provided and the energy supplier and a power set can be connected for providing power and maintaining communication and control, so the disadvantages existed in prior art can be improved.

Another objective of the present invention is to provide a submarine structure, wherein the submarine is able to dive into the water for being continuously used for voyaging or floating or skin diving or deep diving.

One another objective of the present invention is to provide a submarine structure, in which a function of viewing the scenery under the water can be provided, and the submarine can cruise to a specified location by a manual force or remote control or global positioning system for the purposes of military defense or commercial data collection.

Still one another objective of the present invention is to provide a submarine structure, in which the operation convenience and mobility can be effectively increased.

The problem to be solved by the present invention is that: in the general leisure activity on the water or in the water, the most common one is skin diving or scuba diving or taking a small boat or go inside a glass boat having transparent glasses at the bottom of the boat for viewing the scenery under the water (under the ocean); however, the skin diving is only suitable in a shallow water area, because the tourist only wears a simple goggles with a breathing tube, so he/she can only dive in a shallow water area with his/her head facing down and only small amount of fishes can be seen due to the water is not clear; although scuba diving can allow he/her to see more of the scenery under the water in a deeper water area, the tourist who has no scuba diving outfit or cannot swim or not trained for scuba diving or without much diving experience is strongly advised not to take such a risk because various danger may happened under the water; taking a small boat for viewing the scenery under the water (under the ocean) is unable to allow the tourist to actually dive into the water (into the ocean), so the tourist can only sit in the small boat to see the relatively boring scenery comparing to the vivid one under the water; the glass boat can allow the tourist to see the scenery through the transparent glasses at the bottom of the boat, but the tourist also cannot actually dive into the water, and the viewing sensation may be affected by the lightings and the tourists is unable to look at specified and desired area due to the limitation of the boat, not to mention unable to actually be in the water for skin diving or deep diving, so the experience of viewing different scenery in different water areas (ocean areas) cannot be provided; moreover, the functions that a conventional small boat can provide is very limited, so the boat cannot be voyaged to a specified location by a means of unmanned control or global positioning system, thus the boat is unable to be used for the purposes of military defense or commercial data collection, thus the applicable field is very much limited.

Accordingly, the present invention provides a submarine structure, which provides a submarine in which the interior thereof is formed with an accommodation space and an electricity storing chamber connected to the accommodation space and having a battery and a power set having a propeller, used for floating, skin diving or deep diving in water and includes:

at least one pipe, having one end thereof connected to and communicated with the accommodation space of the submarine, wherein the interior thereof is installed with at least one cable;

at least one floating member, connected to another end of the at least one pipe;

at least one energy supplier, disposed in the floating member or the accommodation space and located at a relatively higher location inside the floating member or the accommodation space;

at least one control board, installed in the accommodation space of the submarine or the floating member, wherein the control board is connected to the energy supplier through the cable of the at least one pipe for providing power and maintaining communication and control.

Preferably, according to the present invention, the at least one pipe includes an air tube and a control cable tube having the cable.

Preferably, according to the present invention, the air tube includes an air inlet tube and an air outlet tube.

Furthermore, according to the present invention, the air inlet tube and the air outlet tube of the air tube of the at least one pipe are respectively installed with a pump connected to the control board.

Furthermore, according to the present invention, a waterproof layer is formed on the floating member.

Furthermore, according to the present invention, the floating member is additionally installed with a radio device.

Furthermore, according to the present invention, the radio device is installed with a global poisoning system (GPS).

Preferably, according to the present invention, the air tube and the control cable tube of the at least one pipe are assembled as one piece or in a separated status.

Preferably, according to the present invention, the at least one pipe is able to be accommodated in the accommodation space of the submarine.

Furthermore, according to the present invention, the submarine and the floating member are respectively installed with a position controller capable of performing mutual sonic and electrically connected and connected to the cable, and the rear of the floating member is installed with at least one booster connected to the cable and the position controller of the floating member.

Furthermore, according to the present invention, a plurality of multimedia devices are respectively installed between the submarine and the floating member, which includes a camera, a sound generating device and a fish detector.

Furthermore, according to the present invention, the energy supplier includes a power generator, a solar cell and a storage battery.

Furthermore, according to the present invention, the submarine is installed with at least one hardware emitting device.

Comparing with prior art, advantages achieved by the present invention are as followings: the energy supplier installed in the floating member can be used for providing electric power to the submarine and electrically charging the battery; through the at least one pipe connected between the submarine and the floating member, the air intaking and discharging performance of the accommodation space of the submarine can be provided and the energy supplier and the power set can be connected for providing power and maintaining communication and control, so the submarine is able to dive into the water for being continuously used for voyaging or floating or skin diving or deep diving, and a function of viewing the scenery under the water can be provided, and the submarine can cruise to a specified location by a means of manual force or unmanned control or global positioning system for the purposes of military defense or commercial data collection, so the operation convenience and mobility can be effectively increased. Accordingly, the present invention is novel and more practical in use comparing to prior art.

DETAILED DESCRIPTION OF THE PREFERRED EMBODIMENT

Figure 1:
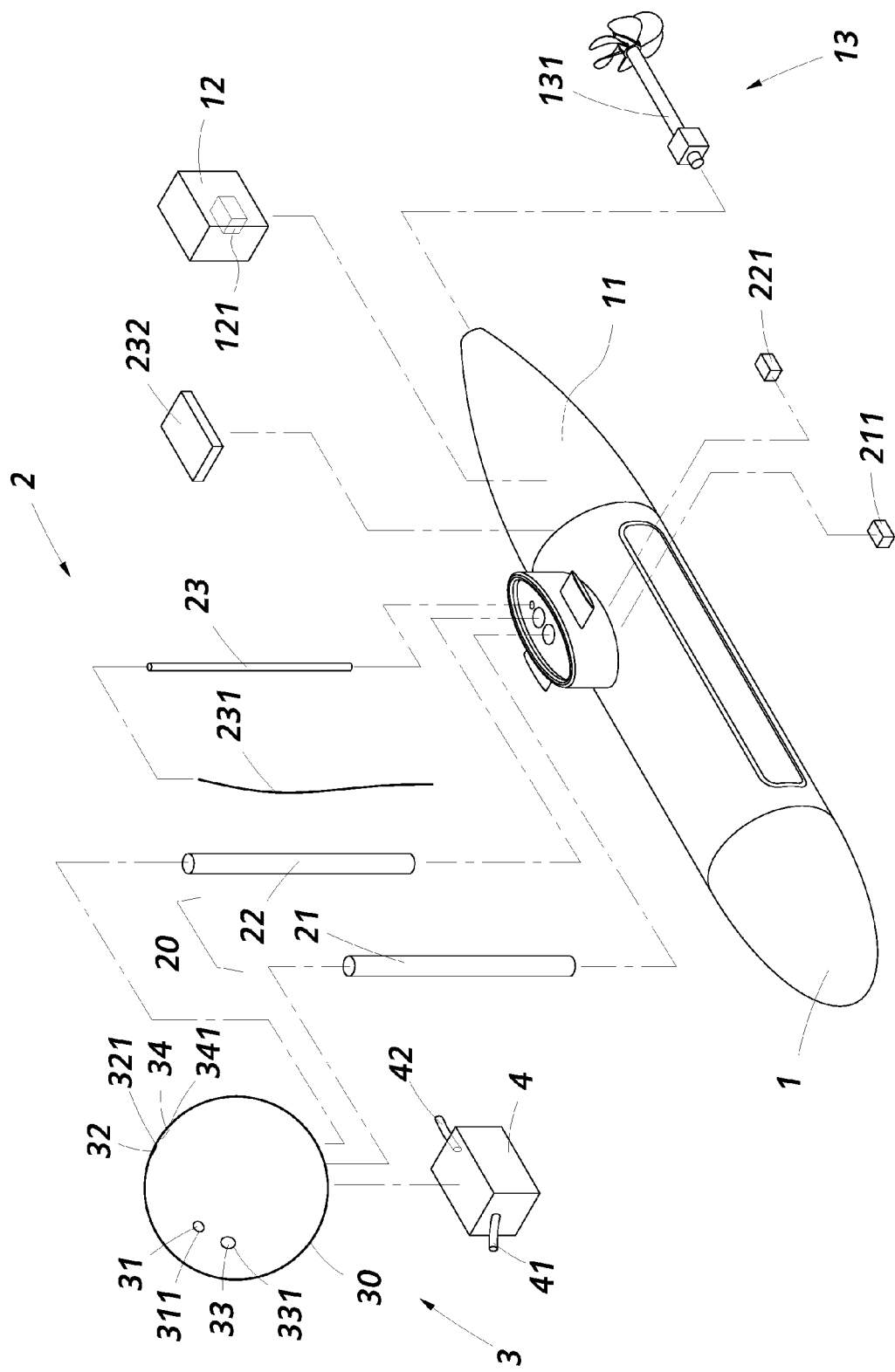
FIG. 1 is a perspective exploded view according to the present invention.
Figure 2:
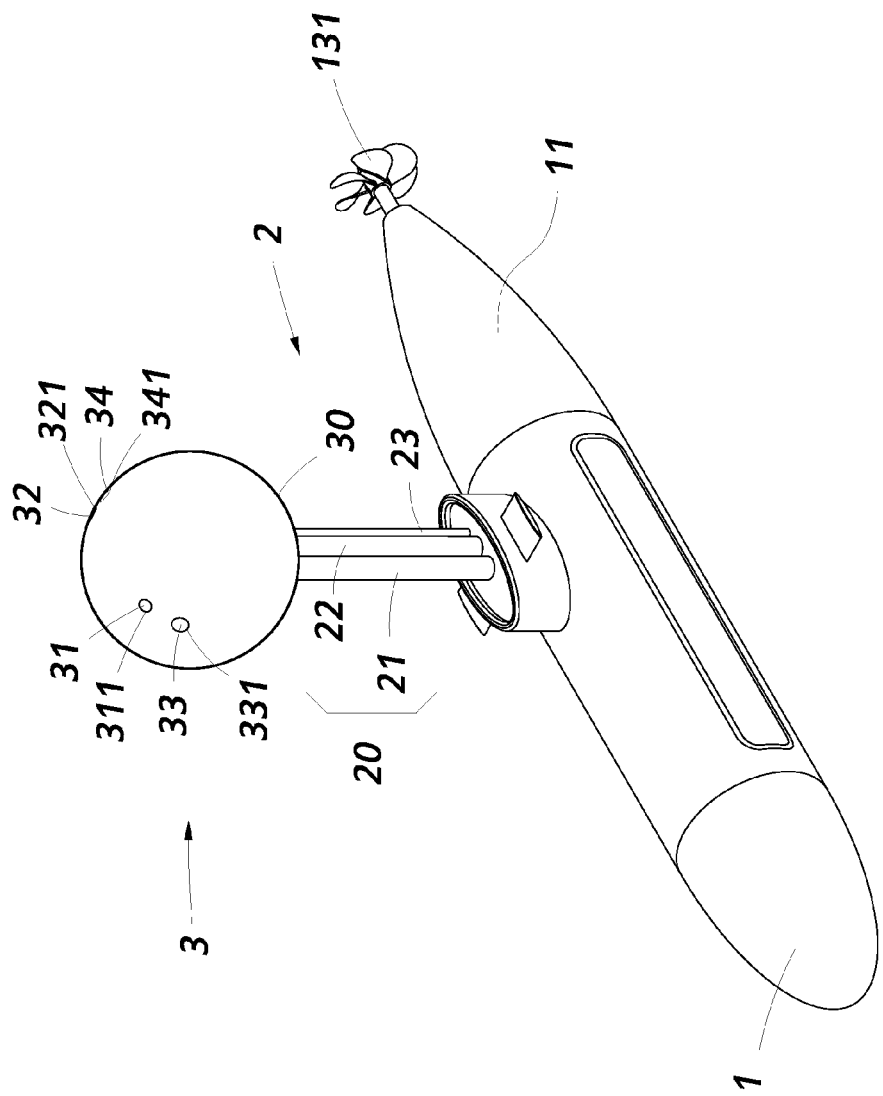
FIG. 2 is a perspective view showing the assembly according to the present invention.
Figure 3:
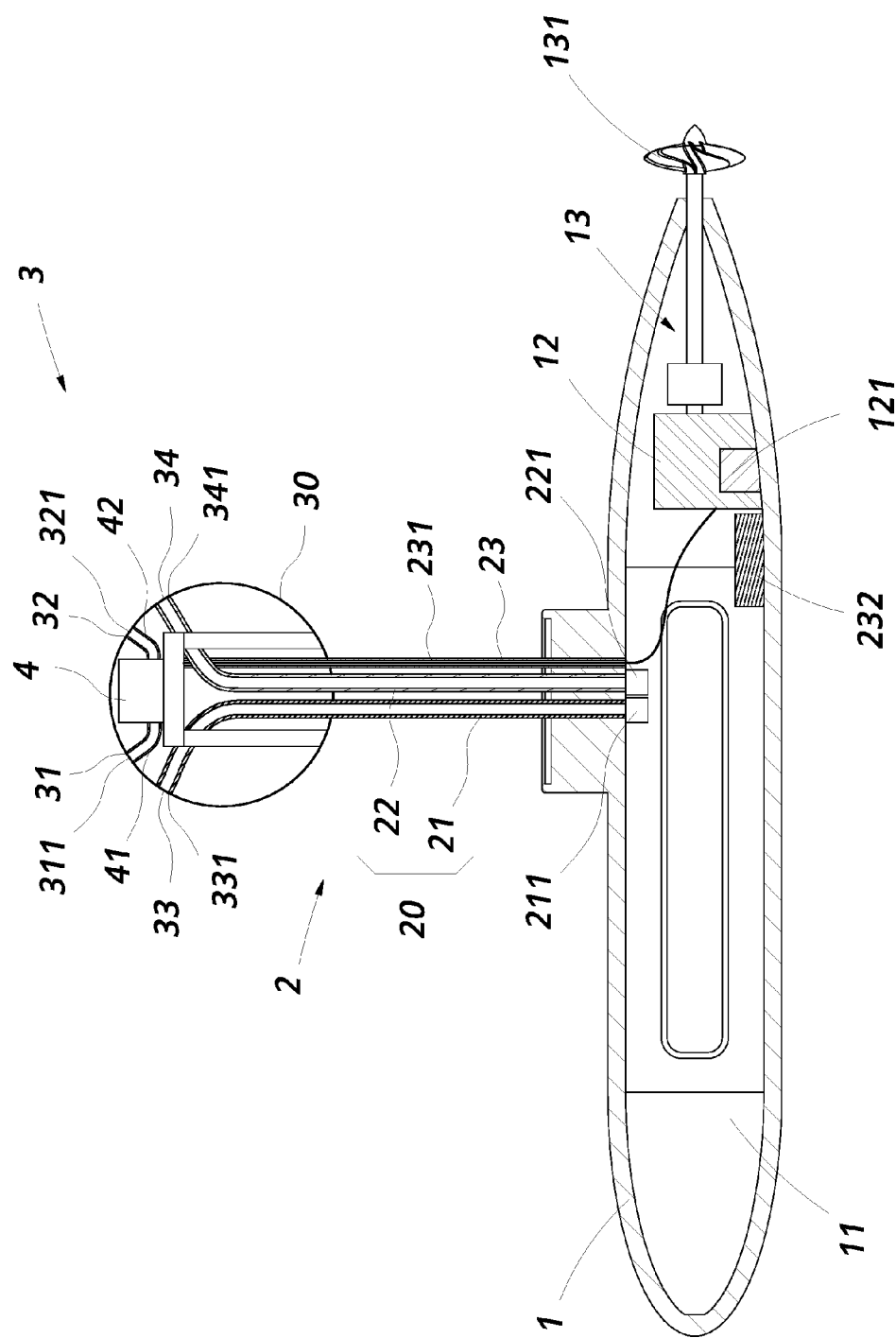
FIG. 3 is a cross sectional view showing the assembly according to the present invention.
Figure 4:
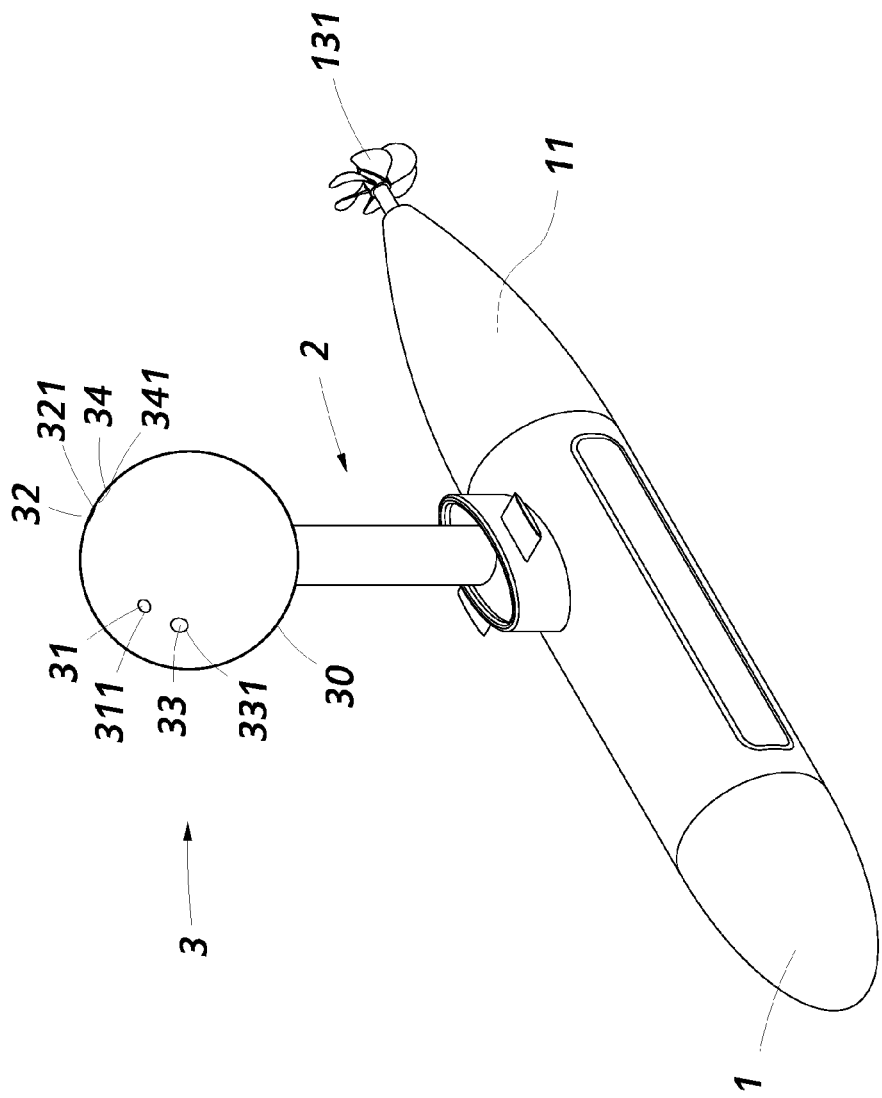
FIG. 4 is a perspective view showing another assembly according to another embodiment of the present invention.
Figure 5:
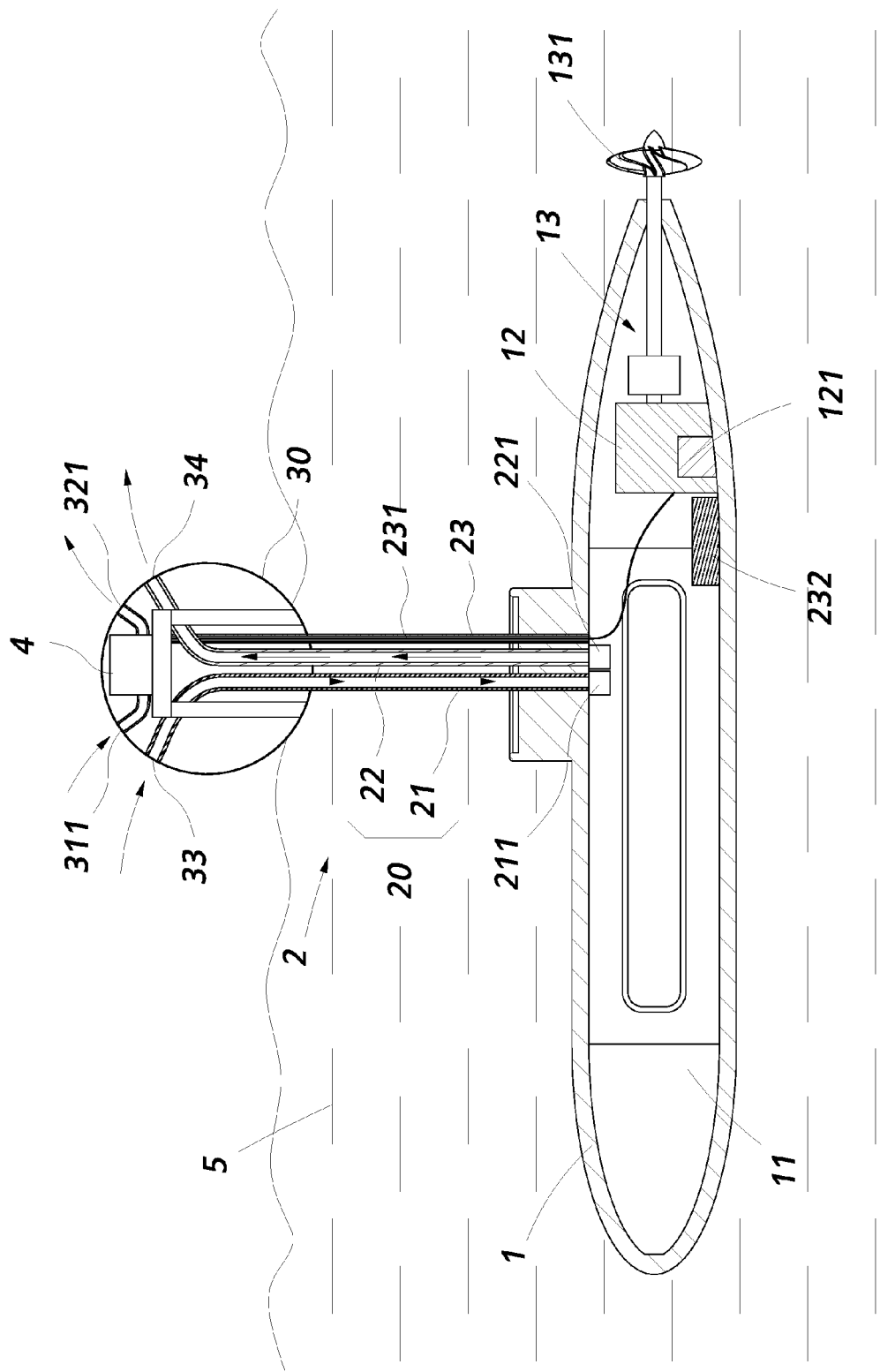
FIG. 5 is a schematic view showing the floating member and the energy supplier performing air intaking and discharging and the floating member and the accommodation space of the submarine performing air intaking and discharging through the pipe according to one embodiment of the present invention.

Referring from FIG. 1 to FIG. 5, wherein FIG. 1 is a perspective exploded view according to the present invention; FIG. 2 is a perspective view showing the assembly according to the present invention; FIG. 3 is a cross sectional view showing the assembly according to the present invention; FIG. 4 is a perspective view showing another assembly according to another embodiment of the present invention; and FIG. 5 is a schematic view showing the floating member and the energy supplier performing air intaking and discharging and the floating member and the accommodation space of the submarine performing air intaking and discharging through the pipe according to one embodiment of the present invention. Accordingly, the present invention provides a submarine structure, which provides a submarine 1 in which the interior thereof is formed with an accommodation space 11 and an electricity storing chamber 12 connected to the accommodation space 11 and having a battery 121 and a power set 13 having a propeller 131, used for floating, skin diving or deep diving in water 5 and includes: at least one pipe 2, at least one floating member 3, at least one energy supplier 4 and at least one control board 232 according to one preferred embodiment.

One end of the at least one pipe 2 is connected to and communicated with the accommodation space 11 of the submarine 1, and the interior thereof is installed with a cable 231; the at least one pipe 2 includes an air tube 20 and a control cable tube 23 having at least one cable 231; the air tube 20 includes an air inlet tube 21 and an air outlet tube 22, according to this embodiment, the at least one pipe 2 is a soft pipe 2, but what shall be addressed is that the scope of the present invention is not limited to the above-mentioned arrangement, the at least one pipe 2 can also be a hard pipe 2; the air inlet tube 21 and the air outlet tube 22 of the air tube 20 are used for allowing the air intaking and discharging to be easier and faster, and the air inlet tube 21 and the air outlet tube 22 are respectively installed with a pump 211, 221; for properly adjusting the distance between the submarine 1 and the floating member 3 when the floating, skin diving or deep diving is performed, the at least one pipe 2 is enabled to be accommodated in the accommodation space 11 of the submarine 1; moreover, the air tube 20 and the control cable tube 23 of the at least one pipe 2 can be assembled as one piece (as shown in FIG. 4) or the air inlet tube 21, the air outlet tube 22 and the control cable tube 23 of the air tube 20 can be in a separated status (as shown in FIG. 1, FIG. 2 and FIG. 3).

The at least one floating member 3 is connected to another end of the at least one pipe 2, the floating ember 3 is formed as a hollow member, and the front and the rear defined at the top end thereof are respectively formed with at least four holes 31, 32, 33, 34 which are divided into two sets and correspondingly facing each other, the at least four holes 31, 32, 33, 34 are respectively disposed with a waterproof cover 311, 321, 331, 341, wherein the two holes 33, 34 formed as one set and respectively located at the front and the rear are connected to the air inlet tube 21 and the air outlet tube 22 of the air tube 20 through the at least one pipe 2 thereby providing a function of performing air intaking and discharging; for enabling the floating member 3 to be waterproof, a waterproof layer 30 is formed on the floating member 3.

The at least one energy supplier 4 is disposed and in the floating member 3 and located at a relatively higher location inside the floating member 3, but what shall be addressed is that the scope of the present invention is not limited to the above-mentioned arrangement, the at least one energy supplier 4 can also be disposed in the accommodation space 11, according to this embodiment, the front and the rear of the energy supplier 4 are respectively formed with an air inlet hole 41 and an air outlet hole 42, the air inlet hole 41 and the air outlet hole 42 are connected to the two holes 31, 32 formed as another set and respectively located at the front and the rear of the floating member 3, the energy supplier 4 is served to supply the electric energy to the battery 121 in the electricity storing chamber 12, and to provide the continuously required electric power to the submarine 1, the electric power for enabling the propeller 131 of the power set 13 to rotate and the electric power required by the pumps 211, 221 of the air inlet tube 21 and the air outlet tube 22 for allowing the air intaking and discharging to be easier and faster, and also served to provide electric power to any location of the submarine 1 where the electric power is required; the energy supplier 4 includes a power generator, a solar cell and a storage battery, but what shall be addressed is that the scope of the present invention is not limited to the above-mentioned arrangement, the energy supplier 4 can also be any device capable of supplying electric power.

The at least one control board 232 is installed in the accommodation space 11 of the submarine 1 or the floating member 3, the control board 232 is connected to the energy supplier 4 through the cable 231 of the at least one pipe 2 for providing power and maintaining communication and control; the pumps 211, 221 of the air inlet tube 21 and the air outlet tube 22 of the air tube 20 of the at least one pipe 2 are connected to the control board 232; the control board 232 is respectively connected to the batter 121 of the electricity storing chamber 12 and the energy supplier 4 and the pumps 211, 221 through the cable 231, thus a user can be in the accommodation space 11 of the submarine 1 to control the energy supplier 4 for charging, enabling the pumps 211, 221 to perform air intaking and discharging or enabling the power set 13 to be in an operating status.

Referring to FIG. 5 which is a schematic view showing the floating member and the energy supplier performing air intaking and discharging and the floating member and the accommodation space of the submarine performing air intaking and discharging through the pipe according to one embodiment of the present invention. According to this embodiment, the energy supplier 4 is disposed in the accommodation space 11 of the floating member 3 and located at a relatively higher location inside the floating member 3, the front and the rear of the energy supplier 4 are respectively formed with the air inlet hole 41 and the air outlet hole 42 connected to the two holes 31, 32 formed as one set and respectively located at the front and the rear of the floating member 3, when the submarine 1 is operated for voyaging or floating or skin diving or deep diving, the holes 31, 32 at the front and the rear are served to introduce fresh air and discharge waste air, because the holes 31, 32 are located at different locations for the purpose of shunting, the waste air in the hole 32 at the rear would not affect the fresh air introduced through the hole 31 at the front, the holes 33, 34 formed as another set and located at the front and the rear of the floating member 3 connected to the air inlet tube 21 and the air outlet tube 22 of the air tube 20 of the at least one pipe 2 are also in a front/rear shunting status, so when the air inlet tube 21 is used for introducing air, the air introducing operation is prevented from being affected by the waste air discharging operation of the air outlet hole 42 of the energy supplier 4 and the air outlet tube 22.

Figure 6:
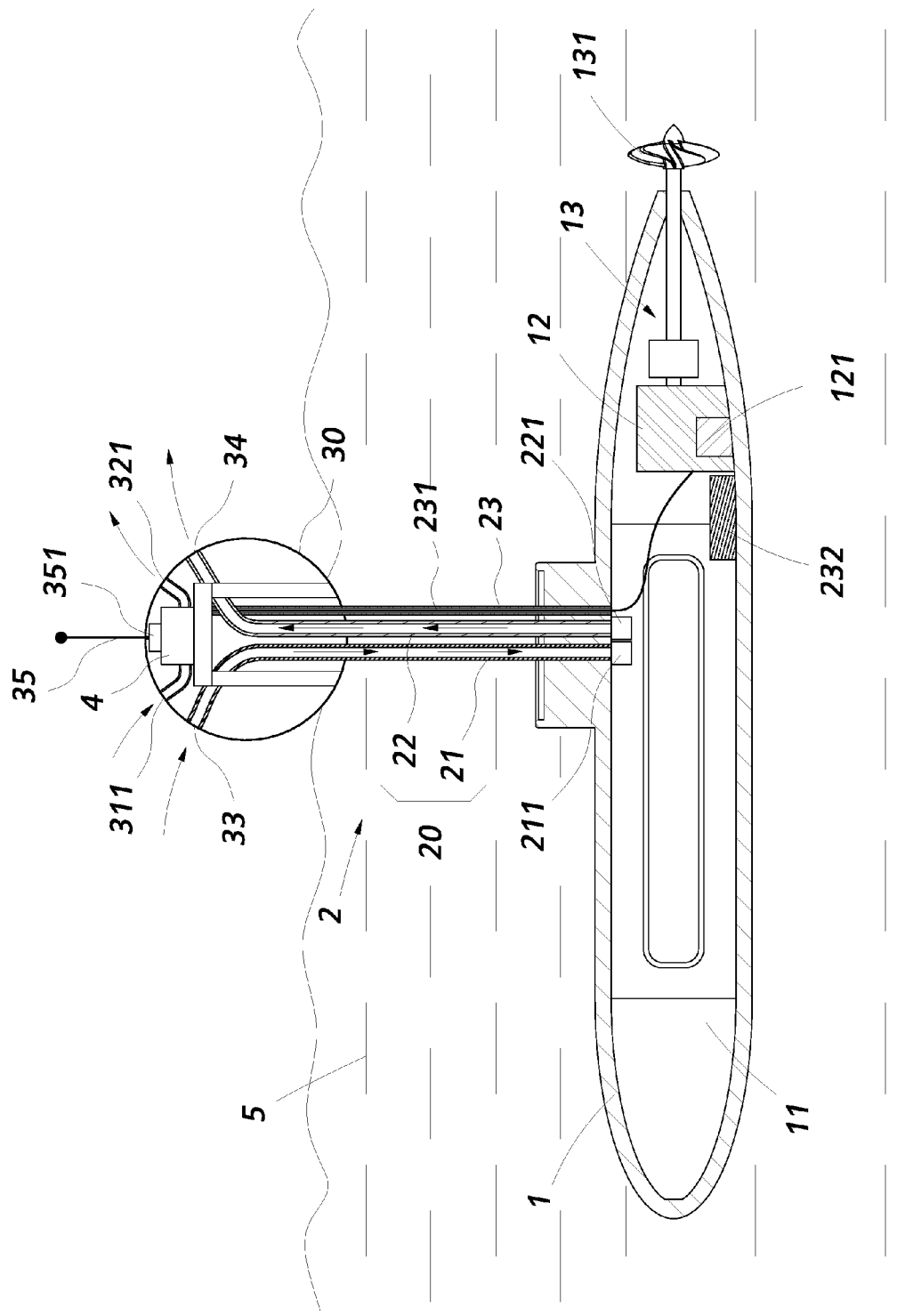
FIG. 6 is a cross sectional view showing the floating member shown in FIG. 2 being installed with the radio device.
Figure 7:
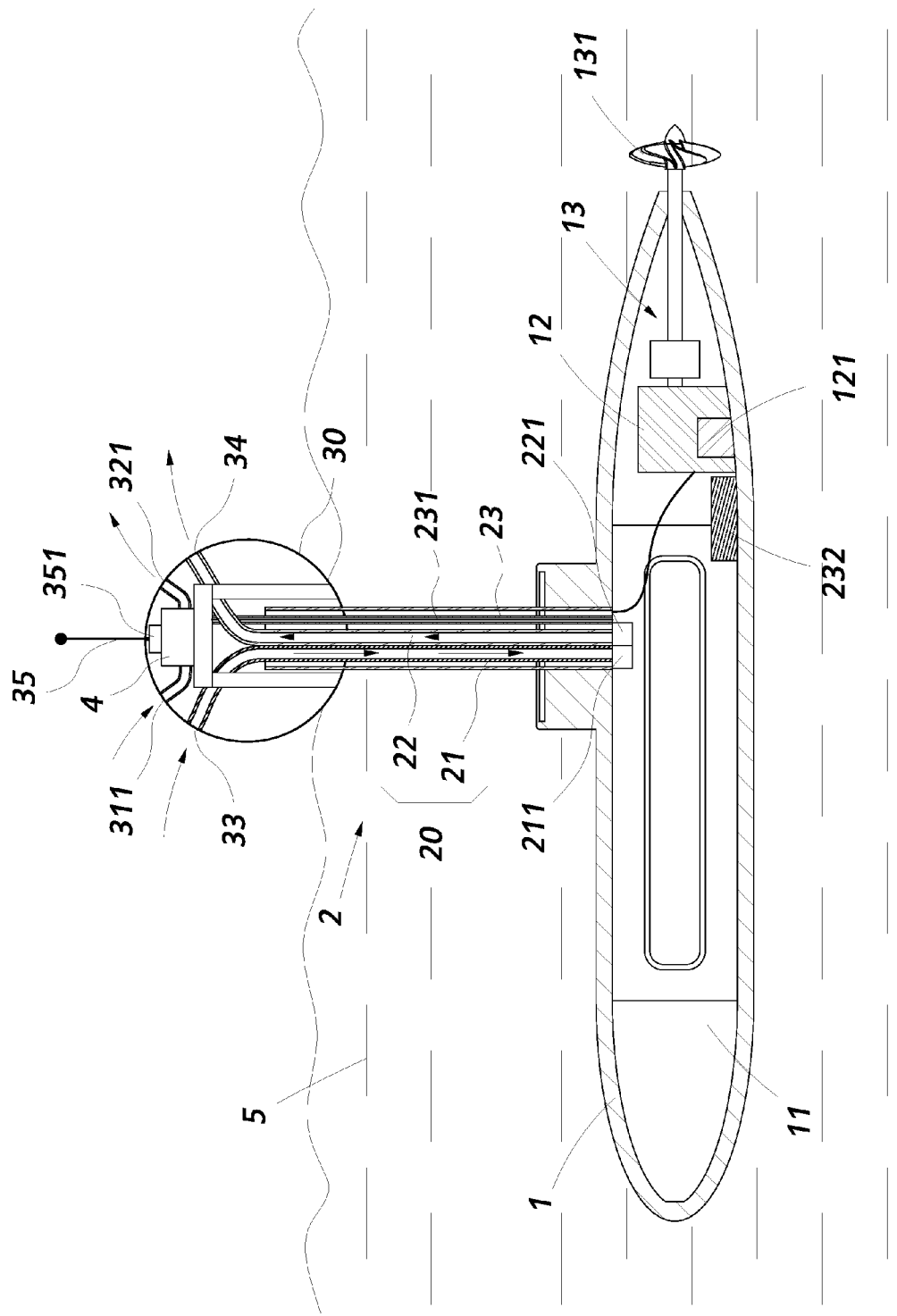
FIG. 7 is a cross sectional view showing the floating member shown in FIG. 4 being installed with the radio device.

Referring to FIG. 6 and FIG. 7, wherein FIG. 6 is a cross sectional view showing the floating member shown in FIG. 2 being installed with the radio device; and FIG. 7 is a cross sectional view showing the floating member shown in FIG. 4 being installed with the radio device. According to the present invention, the floating member 3 further includes a radio device 35, the radio device 35 is installed with a global poisoning system (GPS) 351, so the submarine 1 cannot only be operated by a manual force, the submarine 1 can also be operated by a mobile phone or various control devices through the radio device 35 having the global positioning system 351, thereby achieving objectives of remotely controlling and automatically controlling; as shown in FIG. 2, the air tube 20 and the control cable tube 23 of the at least one pipe 2 are assembled as one piece, the radio device 35 is installed thereon and the global positioning device 351 can also be installed thereon if required (as shown in FIG. 6); as shown in FIG. 4, the air inlet tube 21, the air outlet tube 22 and the control cable tube 23 of the air tube 20 are in a separated status, the radio device 35 is installed thereon and the global positioning device 351 can also be installed thereon if required (as shown in FIG. 7).

Figure 8:
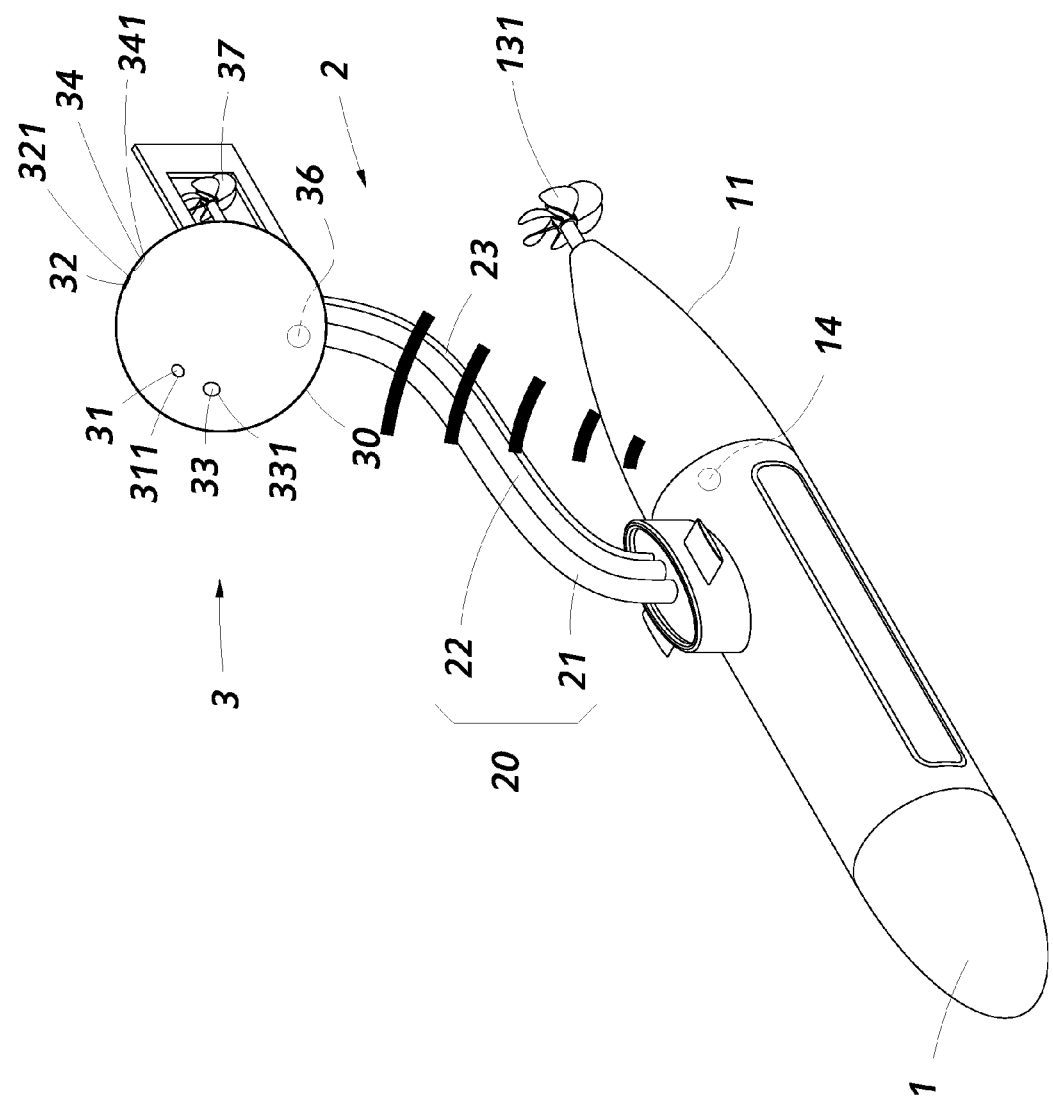
FIG. 8 is a perspective view showing the submarine and the floating member being respectively installed with the position controller and the floating member being installed with the booster according to the present invention.
Figure 9:
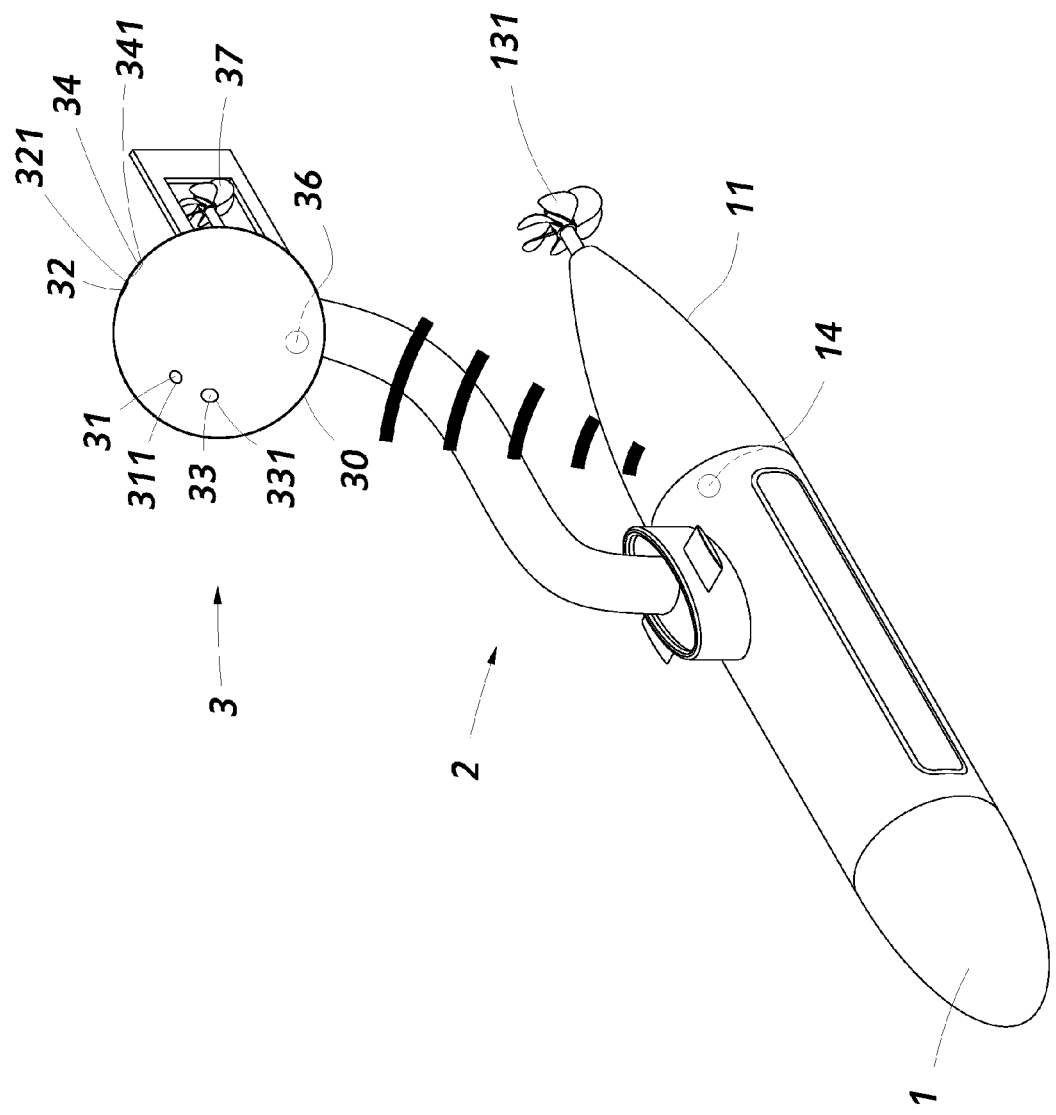
FIG. 9 is a perspective view showing the submarine and the floating member being respectively installed with the position controller and the floating member being installed with the booster according to another embodiment of the present invention.

Referring to FIG. 8 and FIG. 9, wherein FIG. 8 is a perspective view showing the submarine and the floating member being respectively installed with the position controller and the floating member being installed with the booster according to the present invention; and FIG. 9 is a perspective view showing the submarine and the floating member being respectively installed with the position controller and the floating member being installed with the booster according to another embodiment of the present invention. According to the present invention, for enabling the floating member 3 to move with the submarine 1 and preventing the pipe 2 from being overly pulled, a position controller 14 connected to the cable 231 is installed in the submarine 1, the position controller 14 is a sonic position controller 14, but what shall be addressed is that the scope of the present invention is not limited to the above-mentioned arrangement, the position controller 14 can also be any type of position controller; the floating member 3 is installed with a position controller 36 connected to the cable 231 and electrically connected to the position controller 14, the position controller 36 is a sonic position controller 36, but what shall be addressed is that the scope of the present invention is not limited to the above-mentioned arrangement, the position controller 36 can also be any type of position controller; the position controller 36 of the floating member 3 is controlled and traced by the position controller 14 of the submarine 1, for enabling the floating member 3 to generate power and effectively trace the location of the submarine 1, the rear of the floating member 3 is installed with at least one booster 37 connected to the cable 231 and the position controller 36 of the floating member 3, thus when the submarine 1 cruises to a certain location, the floating member 3 utilizes a means of sonic positioning and the propeller 37 for moving the floating member 3 to a certain range relative to the periphery of the submarine 1, so the at least one pipe 2 between the floating member 3 and the submarine 1 is prevented from being overly pulled; FIG. 8 discloses an embodiment showing the pipe 2 shown in FIG. 2 being elongated and the position controllers 14, 36 being disposed between the submarine 1 and the floating member 3 and the floating member 3 being installed with the booster 37; FIG. 9 discloses an embodiment showing the pipe 2 shown in FIG. 4 being elongated and the position controllers 14, 36 being disposed between the submarine 1 and the floating member 3 and the floating member 3 being installed with the booster 37.

Figure 10:
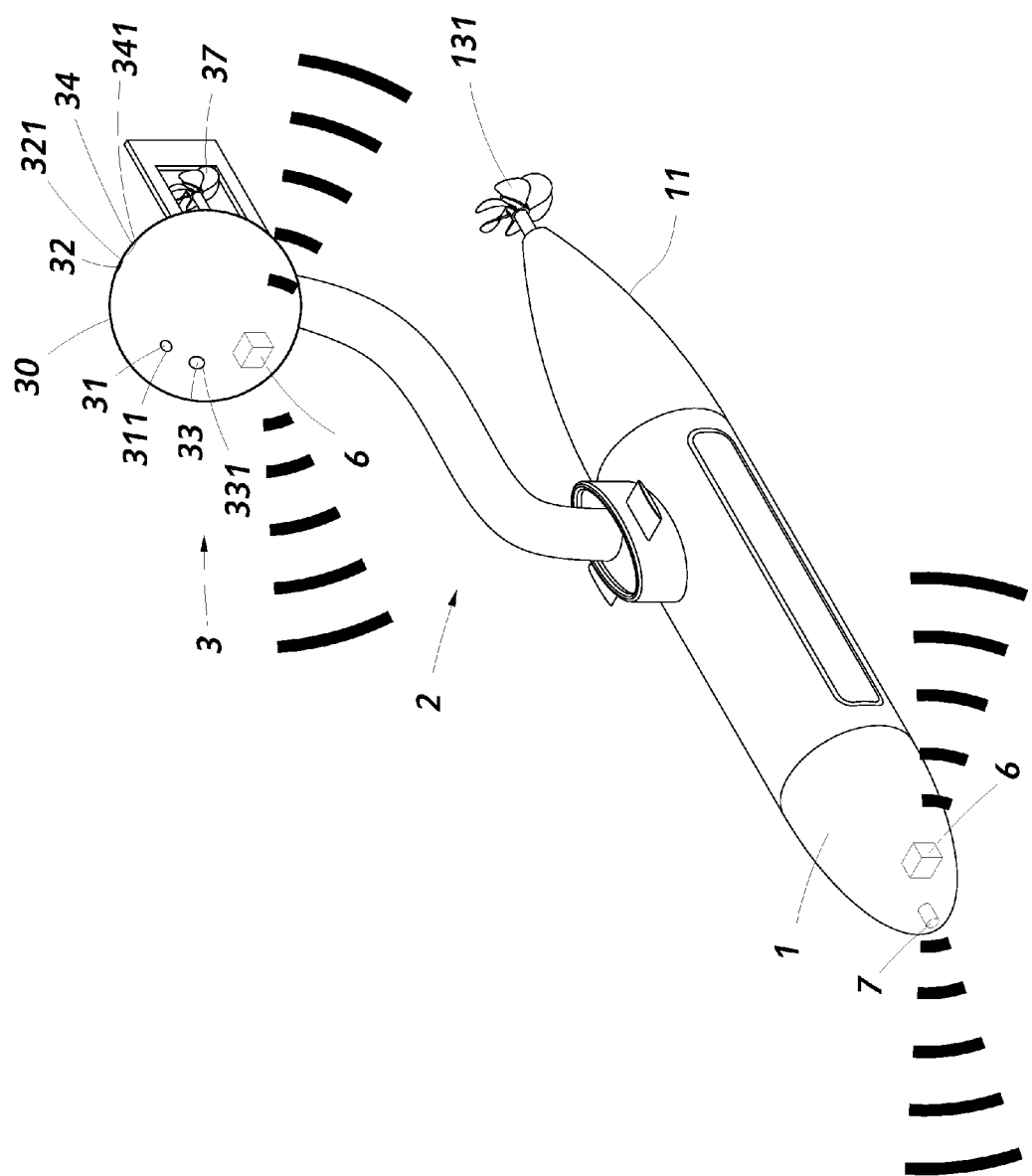
FIG. 10 is a schematic view showing a plurality of the multimedia devices being installed between the submarine and the floating member and the submarine being installed with the hardware emitting device according to the present invention.

Referring to FIG. 10, which is a schematic view showing a plurality of the multimedia devices being installed between the submarine and the floating member and the submarine being installed with the hardware emitting device according to the present invention. According to the present invention, a plurality of multimedia devices 6 are respectively installed in the submarine 1 and the floating member 3, the plurality of multimedia devices 6 include a camera, a sound generating device and a fish detector, but what shall be addressed is that the scope of the present invention is not limited to the above-mentioned arrangement, the multimedia devices 6 can also be other multimedia devices; furthermore, the submarine 1 is installed with at least one hardware emitting device 7.

Comparing with prior art, advantages achieved by the present invention are as followings: the energy supplier 4 installed in the floating member 3 can be used for providing electric power to the submarine 1 and electrically charging the battery 121; through the at least one pipe 2, the air intaking and discharging performance of the accommodation space 11 of the submarine 1 can be provided and the energy supplier 4 and the power set 13 can be connected for providing power and maintaining communication and control, so the submarine 1 is able to dive into the water 5 for being continuously used for voyaging or floating or skin diving or deep diving, and a function of viewing the scenery under the water 5 can be provided, and the submarine 1 can cruise to a specified location by a means of manual force or unmanned control or global positioning system for the purposes of military defense or commercial data collection, so the operation convenience and mobility can be effectively increased. Accordingly, the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A submarine structure comprising:
a submarine in which the interior thereof being formed with an accommodation space and an electricity storing chamber connected to the accommodation space and having a battery and a power set having a propeller, used for floating, skin diving or deep diving in water and including:
   at least one pipe, having one end thereof connected to and communicated with the accommodation space of the submarine, wherein the interior thereof is installed with at least one cable;
   at least one floating member, connected to another end of the at least one pipe;
   at least one energy supplier, disposed in the floating member and located at a relatively higher location inside the floating member;
   at least one control board, installed in the accommodation space of the submarine, wherein the control board is connected to the energy supplier through the cable of the at least one pipe for providing power and maintaining communication and control;
   wherein the submarine and the floating member are respectively installed with a position controller capable of performing mutual sonic positioning and electrically connected and connected to the cable, and the rear of the floating member is installed with at least one booster connected to the cable and the position controller of the floating member.

2. The submarine structure as claimed in claim 1, wherein the at least one pipe includes an air tube and a control cable tube having the cable.

3. The submarine structure as claimed in claim 2, wherein the air tube includes an air inlet tube and an air outlet tube.

4. The submarine structure as claimed in claim 3, wherein the air inlet tube and the air outlet tube of the air tube of the at least one pipe are respectively installed with a pump connected to the control board.

5. The submarine structure as claimed in claim 4, wherein a waterproof layer is formed on the floating member.

6. The submarine structure as claimed in claim 5, wherein the floating member is additionally installed with a radio device, and the radio device is installed with a global poisoning system (GPS).

7. The submarine structure as claimed in claim 5, wherein the at least one pipe is able to be accommodated in the accommodation space of the submarine.

8. The submarine structure as claimed in claim 4, wherein the floating member is additionally installed with a radio device.

9. The submarine structure as claimed in claim 8, wherein the radio device is installed with a global poisoning system (GPS).

10. The submarine structure as claimed in claim 8, wherein the at least one pipe is able to be accommodated in the accommodation space of the submarine.

11. The submarine structure as claimed in claim 2, wherein the air tube and the control cable tube of the at least one pipe are assembled as one piece or in a separated status.

12. The submarine structure as claimed in claim 1, wherein a plurality of multimedia devices are respectively installed in the submarine and the floating member the plurality of multimedia devices include a camera, a sound generating device and a fish detector.

13. The submarine structure as claimed in claim 1, wherein the energy supplier includes a power generator, a solar cell and a storage battery.

* * * * *